(12) United States Patent
Harvey et al.

(10) Patent No.: US 6,247,238 B1
(45) Date of Patent: Jun. 19, 2001

(54) LASER MARKING DEVICE

(76) Inventors: Greg Harvey, 130 Ivy Ct., Vacaville, CA (US) 95687; Robert Harvey, 1080 Windmill, Dixon, CA (US) 95620; Richard Harvey, 1037 Loma Vista, Napa, CA (US) 94558

( * ) Notice: Subject to any disclaimer, the term of this patent is extended or adjusted under 35 U.S.C. 154(b) by 0 days.

(21) Appl. No.: 09/292,584

(22) Filed: Apr. 15, 1999

(51) Int. Cl.[7] .............................. G01C 15/00; B25D 5/00
(52) U.S. Cl. .................................................. 33/286; 33/578
(58) Field of Search ........................... 33/286, 520, 533, 33/613, 645, 644, DIG. 21, 666, 670, 574, 227, 228, 281, 282, 285.89, 484, 485, 290, 292, 293, 263

(56) References Cited

U.S. PATENT DOCUMENTS

| | | | |
|---|---|---|---|
| 685,455 | * 10/1901 | Kinkead | 33/286 |
| 1,003,043 | * 9/1911 | Goughnour | 33/578 |
| 3,015,889 | * 1/1962 | Godman | 33/578 |
| 3,628,253 | * 12/1971 | Shepard | 33/578 |
| 3,771,880 | 11/1973 | Bennett | 356/446 |
| 4,334,780 | 6/1982 | Pernick | 356/512 |
| 4,364,663 | 12/1982 | Gardner et al. | 356/371 |
| 4,803,374 | 2/1989 | Monfort et al. | 250/559.16 |
| 4,916,824 | 4/1990 | Shimazutsu et al. | 33/551 |
| 4,972,092 | 11/1990 | Schmitt et al. | 250/559.11 |
| 4,973,164 | 11/1990 | Weber et al. | 356/371 |
| 5,410,410 | 4/1995 | Yamazaki et al. | 356/376 |
| 5,488,781 | * 2/1996 | Van Der Horst | 33/286 |
| 5,507,097 | * 4/1996 | Duey et al. | 33/286 |
| 5,566,459 | * 10/1996 | Breda | 33/DIG. 21 |
| 5,568,265 | * 10/1996 | Matthews | 33/286 |
| 5,608,527 | 3/1997 | Valliant et al. | 356/371 |
| 5,617,645 | 4/1997 | Wick et al. | 33/551 |
| 5,661,556 | 8/1997 | Schiff et al. | 356/236 |
| 5,757,496 | 5/1998 | Yamazaki | 356/371 |
| 5,778,551 | 7/1998 | Herklotz et al. | 33/554 |
| 5,937,531 | * 8/1999 | Menk et al. | 33/645 |
| 5,979,068 | * 11/1999 | Andrews | 33/520 |
| 6,082,013 | * 7/2000 | Peterhans | 33/285 |
| 6,096,049 | * 8/2000 | McNeirney et al. | 33/286 |

FOREIGN PATENT DOCUMENTS

179478 * 7/1966 (SU) ...................................... 33/286

* cited by examiner

*Primary Examiner*—Diego Gutierrez
*Assistant Examiner*—Quyen Doan

(57) ABSTRACT

A laser marking device for marking a reference point with laser light so that accurate measurements can be made to that point. The laser marking device includes a support bar that has first and second ends and a longitudinal axis extending between the first and second ends. The first and second ends are adapted to slidably rest on the horizontal portions of an adjacent pair of T-bars of a suspended ceiling. An illuminating device emits a beam of light to illuminate a reference point. The illuminating device is slidably mounted to the support bar.

14 Claims, 2 Drawing Sheets

LASER MARKING DEVICE

BACKGROUND OF THE INVENTION

1. Field of the Invention

The present invention relates to centerings jigs and more particularly pertains to a new laser marking device for marking a reference point with laser light so that accurate measurements can be made to that point.

2. Description of the Prior Art

The use of centering jigs is known in the prior art. More specifically, centering jigs heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 4,900,151; 5,123,742; 5,428,446; 5,623,334; 3,661,463; and U.S. Pat. No. Des. 305,030.

While these devices fulfill their respective, particular objectives and requirements, the aforementioned patents do not disclose a new laser marking device. The inventive device includes a support bar that has first and second ends and a longitudinal axis extending between the first and second ends. The first and second ends are adapted to slidably rest on the horizontal portions of an adjacent pair of T-bars of a suspended ceiling. An illuminating device emits a beam of light to illuminate a reference point. The illuminating device is slidably mounted to the support bar.

In these respects, the laser marking device according to the present invention substantially departs from the conventional concepts and designs of the prior art, and in so doing provides an apparatus primarily developed for the purpose of marking a reference point with laser light so that accurate measurements can be made to that point.

SUMMARY OF THE INVENTION

In view of the foregoing disadvantages inherent in the known types of centering jigs now present in the prior art, the present invention provides a new laser marking device construction wherein the same can be utilized for marking a reference point with laser light so that accurate measurements can be made to that point.

The general purpose of the present invention, which will be described subsequently in greater detail, is to provide a new laser marking device apparatus and method which has many of the advantages of the centering jigs mentioned heretofore and many novel features that result in a new laser marking device which is not anticipated, rendered obvious, suggested, or even implied by any of the prior art centering jigs, either alone or in any combination thereof.

To attain this, the present invention generally comprises a support bar that has first and second ends and a longitudinal axis extending between the first and second ends. The first and second ends are adapted to slidably rest on the horizontal portions of an adjacent pair of T-bars of a suspended ceiling. An illuminating device emits a beam of light to illuminate a reference point. The illuminating device is slidably mounted to the support bar.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new laser marking device apparatus and method which has many of the advantages of the centering jigs mentioned heretofore and many novel features that result in a new laser marking device which is not anticipated, rendered obvious, suggested, or even implied by any of the prior art centering jigs, either alone or in any combination thereof.

It is another object of the present invention to provide a new laser marking device which may be easily and efficiently manufactured and marketed.

It is a further object of the present invention to provide a new laser marking device which is of a durable and reliable construction.

An even further object of the present invention is to provide a new laser marking device which is susceptible of a low cost of manufacture with regard to both materials and labor, and which accordingly is then susceptible of low prices of sale to the consuming public, thereby making such laser marking device economically available to the buying public.

Still yet another object of the present invention is to provide a new laser marking device which provides in the apparatuses and methods of the prior art some of the advantages thereof, while simultaneously overcoming some of the disadvantages normally associated therewith.

Still another object of the present invention is to provide a new laser marking device for marking a reference point with laser light so that accurate measurements can be made to that point.

Yet another object of the present invention is to provide a new laser marking device which includes a support bar that has first and second ends and a longitudinal axis extending between the first and second ends. The first and second ends are adapted to slidably rest on the horizontal portions of an adjacent pair of T-bars of a suspended ceiling. An illuminating device emits a beam of light to illuminate a reference point. The illuminating device is slidably mounted to the support bar.

Still yet another object of the present invention is to provide a new laser marking device that is particularly useful when installing overhead fire sprinklers. The laser beam marks the drop spot where a water pipe will bend downwardly to a sprinkler. The plumber can take measurements between an existing pipe and the laser dot and cut a pipe precisely to fit.

Even still another object of the present invention is to provide a new laser marking device that requires no special tools or equipment to mount, but rather rests on the T-bars of a suspended ceiling.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
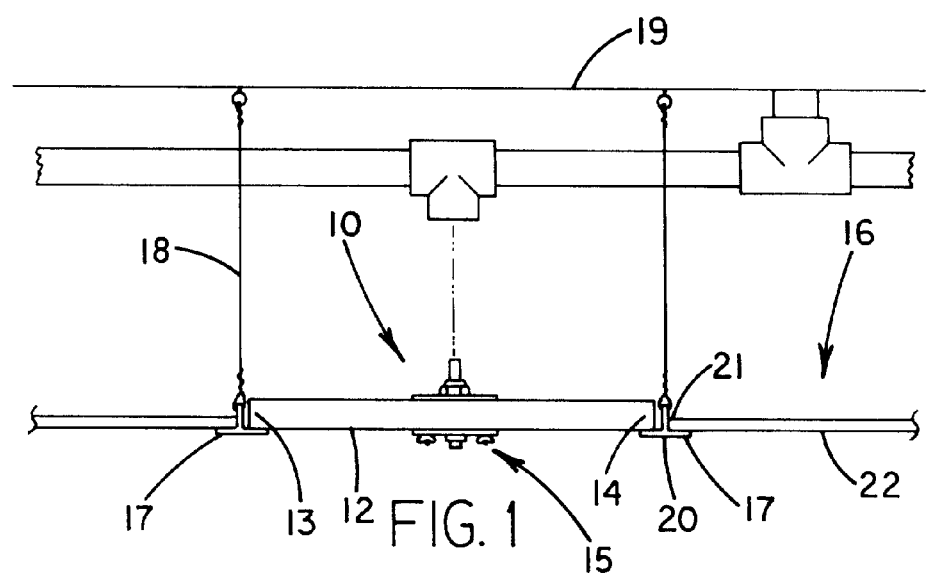
FIG. 1 is a schematic side view of a new laser marking device according to the present invention.
Figure 2:
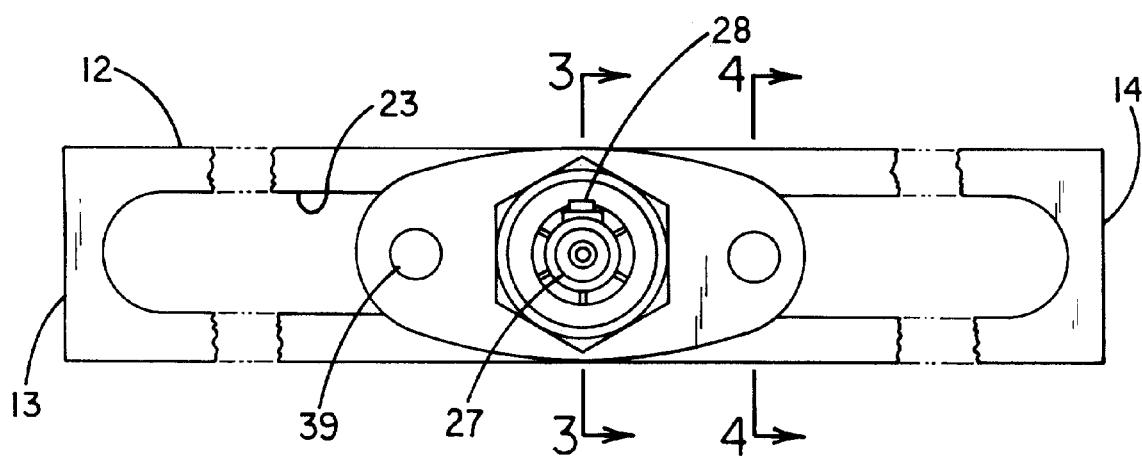
FIG. 2 is a schematic top view of the present invention.
Figure 3:
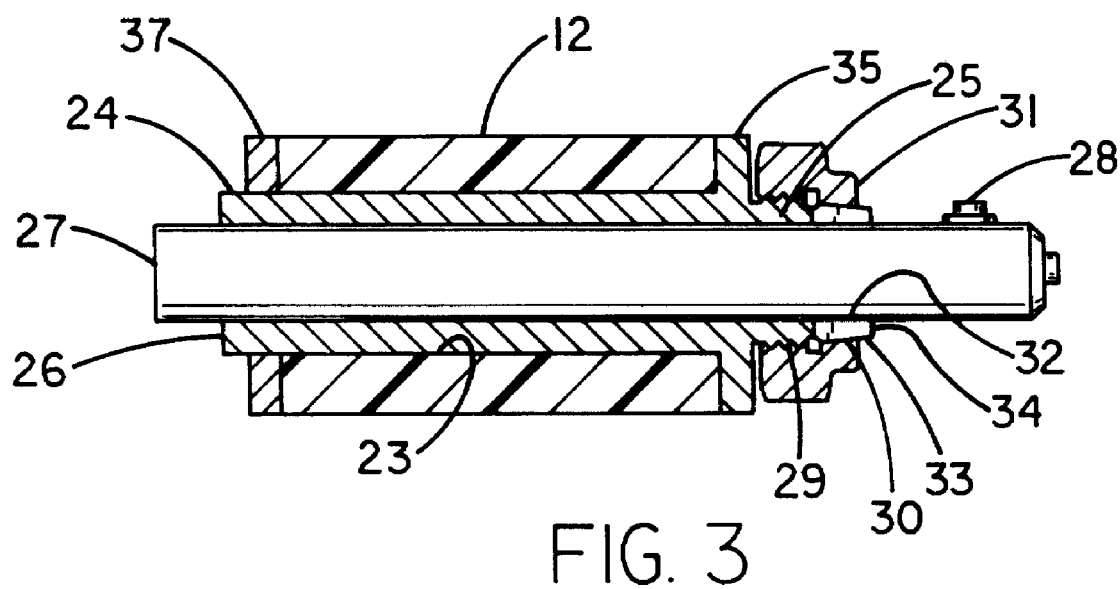
FIG. 3 is a schematic cross sectional view of the present invention taken from line 3—3 of FIG. 2.

With reference now to the drawings, and in particular to FIGS. 1 through 4 thereof, a new laser marking device embodying the principles and concepts of the present invention and generally designated by the reference numeral 10 will be described.

As best illustrated in FIGS. 1 through 4, the laser marking device 10 generally comprises a support bar 12 that has first and second ends 13,14 and a longitudinal axis extending between the first and second ends. The first and second ends are adapted to slidably rest on the horizontal portions of an adjacent pair of T-bars of a suspended ceiling. An illuminating device 15 emits a beam of light to illuminate a reference point. The illuminating device is slidably mounted to the support bar.

In more detail, it is seen in FIG. 1 that the laser marking device is designed to be used when installing sprinkler systems in suspended ceilings 16. The illuminating device is positioned where the sprinkler head (not shown) will go and is turned on. The beam of light emitted by the illuminating device illuminates a reference point corresponding to the position at which a drop pipe (not shown) would extend downwardly to the sprinkler head.

An exemplary suspended ceiling assembly comprises a plurality of first and second T-bars 17, (not shown) that are suspended above a floor such as by cables 18 coupled to a roof or framework 19 of a structure. Each of the T-bars has a horizontal portion 20 and a vertical portion 21 upwardly extending from the horizontal portion.

The first T-bars are uniformly spaced apart and aligned generally parallel each other. The second T-bars are uniformly spaced apart and aligned generally parallel each other. The second T-bars are oriented generally perpendicular to the first T-bars. A plurality of ceiling panels 22 rest on the horizontal portions of the T-bars. Ideally, the distance between the vertical portions of adjacent pairs of first T-bars is between about 24 and 24½ inches. At least one ceiling panel is removed from the T-bars so that the support bar may be placed on the horizontal portions of the T-bars.

The support bar is elongate and has first and second ends and a longitudinal axis extending between the first and second ends. The first and second ends slidably rest on the horizontal portions of an adjacent pair of first T-bars. Ideally, a length of the support bar is defined between the first and second ends thereof, the length of the support bar is about 24 inches. The preferred width and height of the support bar are 2 inches wide and 1 inch high.

Preferably, the support bar has a slot 23 extending through it along its longitudinal axis. Ideally, the slot has rounded ends to permit the illuminating device to slide to the maximum distance towards the ends of the support bar while maintaining strength.

Preferably, the illuminating device has a cylindrical housing 24 extending through the slot of the support bar. The housing is slidable along the slot of the support bar between the first and second ends of the support bar. The housing has primary and secondary ends 25, 26, a longitudinal axis extending between the ends, and a lumen extending through the housing along the longitudinal axis thereof. An exemplary length of the housing between its ends is between about 1 and 3 inches, ideally about 2½ inches, to permit sufficient support when sliding the light emitting device through it.

Also preferably, a light emitting device 27 that emits a beam of light at a surface is slidably inserted in the lumen of the housing. Ideally, the light emitting device comprises a laser of a type know in the art, such as a laser pointer.

The light emitting device has a power switch 28 for selectively turning the light emitting device on and off. The power switch may be of the clicking type that turns the power on when pushed and continues to do so until pushed again. Or the power switch may be of the simple on/off type that permits power flow only so long as it is held down.

Preferably, the primary end of the housing has a threaded portion 29, a plurality of tapered flaps 30 extending from the threaded portion, and a locking nut 31 threadedly engaging the threaded portion and slidably engaging the tapered flaps. More preferably, each of the tapered flaps has an inner surface 32 and an outer surface 33. The inner surfaces of the tapered flaps are generally alignable with the lumen of the housing. The outer surfaces of the tapered flaps taper towards the inner surfaces of the tapered flaps away from the threaded portion of the housing towards outer tips 34 of the flaps.

The light emitting device is disposed between the tapered flaps. Rotating the locking nut in a first direction tightens the tapered flaps against the light emitting device. Rotating the locking nut in a second direction loosens the tapered flaps from against the light emitting device.

Preferably, the primary end of the housing has a peripheral flange 35 extending from it. The peripheral flange rests on the support bar.

Ideally, the peripheral flange has a pair of opposite apertures 36 extending through it. An annular panel 37 is positioned on an opposite side of the support bar with respect to the peripheral flange of the housing. The annular panel has a pair of opposite apertures 38 extending through it and is aligned with the apertures of the peripheral flange. Fasteners 39 couple the peripheral flange to the panel.

Figure 4:
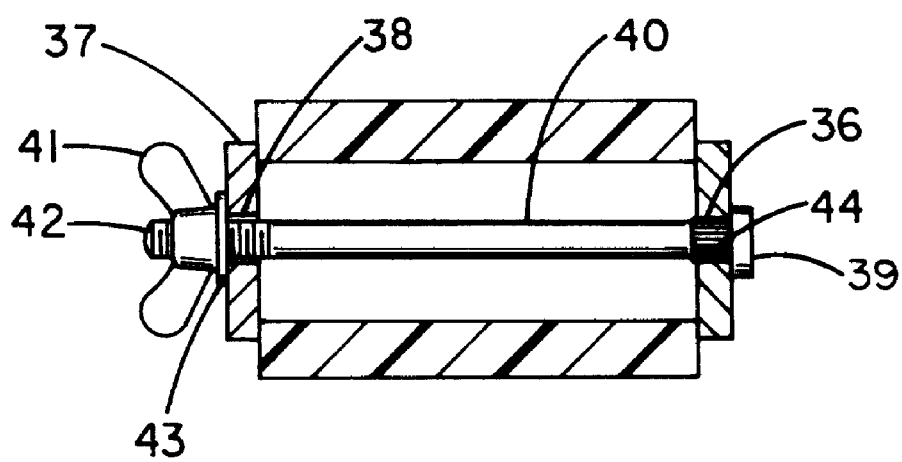
FIG. 4 is a schematic cross sectional view of the present invention taken from line 4—4 of FIG. 2.

As shown in FIG. 4, a pair of elongate threaded bolts 40 extend through the apertures of the annular panel and the peripheral flange. A pair of wing nuts 41 are coupled to threaded ends 42 of the bolts. Tightening the wing nuts forces the panel and peripheral flange towards each other creating clamping action against the support bar which prevents sliding of the illuminating device along the support bar. A pair of washers 43 may be disposed between the wing nuts and panel or peripheral flange.

Also preferably, each of the bolts has a grooved portion 44 extending radially around it. The grooved portions engage the apertures of the peripheral flange or panel to help prevent rotation of the bolts when the wing nuts are tightened and loosened.

Ideally, the peripheral flange has a generally ovaloid shaped outer periphery to permit greater access to the wing nuts, since the apertures may be spaced more apart from the illuminating device, the annular panel has a generally ovaloid shaped outer periphery. The outer periphery could also be round, rectangular, or other shape.

In use, a sprinkler head location is selected. The ceiling panel through which the sprinkler head will extend is removed. The ends of the support bar are rested on the horizontal portions of the T-bars that were holding the removed panel such that the beam of light shines upwardly. The support bar is positioned such that it crosses the proposed location for the sprinkler head. The illuminating device is slid along the support bar until it is positioned directly over the proposed location for the sprinkler head. The laser is turned on. A ruler or tape measure may be used to measure the distance from an existing water pipe to the beam of light at any position along the beam. In this way, a plumber learns what length of pipe to cut to reach from the existing pipe to the position of the drop pipe that will extend downwardly to the sprinkler head.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A marking device for visually illuminating a reference point, comprising:
   a support bar having first and second ends and a longitudinal axis extending between said first and second ends, said first and second ends being adapted for slidably resting on horizontal portions of an adjacent pair of T-bars of a suspended ceiling;
   an illuminating device for emitting a beam of light for lluminating a reference point, said illuminating device being slidably mounted on said support bar;
   wherein said illuminating device has a housing extending through a slot of said support bar, said housing being slidable along said slot of said support bar between said first and second ends of said support bar, said housing having primary and secondary ends, a longitudinal axis extending between said ends, and a lumen extending through said housing along said longitudinal axis thereof;
   wherein said illuminating device has a light emitting device for emitting a beam of light at a surface, said light emitting device being slidably inserted in said lumen of said housing; and
   wherein said primary end of said housing has a threaded portion, a plurality of tapered flaps extending from said threaded portion, and a locking nut threadedly engaging said threaded portion and slidably engaging said tapered flaps, said light emitting device being disposed between said tapered flaps, wherein rotating said locking nut in a first direction tightens said tapered flaps against said light emitting device, wherein rotating said locking nut in a second direction loosens pressure from said tapered flaps against said light emitting device.

2. The marking device of claim 1, wherein said support bar has a slot extending therethrough along said longitudinal axis thereof, said illuminating device extending through said slot of said support bar and being slidable along said slot of said support bar between said first and second ends of said support bar.

3. The marking device of claim 2, wherein said slot has rounded ends.

4. The marking device of claim 1, wherein said light emitting device comprises a laser.

5. The marking device of claim 1, wherein said primary end of said housing has a peripheral flange extending therefrom, said peripheral flange resting on said support bar.

6. The marking device of claim 5, wherein said peripheral flange has a pair of opposite apertures extending therethrough, an annular panel being positioned on an opposite side of said support bar with respect to said peripheral flange of said housing, said annular panel having a pair of opposite apertures extending therethrough and being aligned with said apertures of said peripheral flange, a pair of fasteners coupling said peripheral flange to said panel.

7. The marking device of claim 6, wherein said peripheral flange has a generally ovaloid shaped outer periphery, said annular panel having a generally ovaloid shaped outer periphery.

8. The marking device of claim 6, wherein each of said fasteners has a grooved portion extending radially around, said grooved portions engaging said apertures of said peripheral flange for helping prevent rotation of said fasteners.

9. A measuring system for visually illuminating a reference point comprising, in combination:
   a suspended ceiling assembly, comprising:
      a plurality of first and second T-bars being suspended above a floor, each of said T-bars having a horizontal portion and a vertical portion upwardly extending from said horizontal portion;
      said first T-bars being uniformly spaced apart and aligned generally parallel each other;
      said second T-bars being uniformly spaced apart and aligned generally parallel each other, said second T-bars being oriented generally perpendicular to said first T-bars;

a plurality of ceiling panels resting on said horizontal portions of said T-bars;

wherein at least one ceiling panel is removed from said T-bars;

wherein the distance between said vertical portions of adjacent pairs of first T-bars is between about 24 and 24½ inches;

an elongate support bar having first and second ends and a longitudinal axis extending between said first and second ends, said first and second ends slidably resting said annular panel having a pair of opposite apertures extending therethrough and being aligned with said apertures of said peripheral flange;

a pair of elongate threaded bolts extending through said apertures of said annular panel and said peripheral flange;

a pair of wing nuts being coupled to threaded ends of said bolts; and each of said bolts having a grooved portion extending radially around, said grooved portions engaging said apertures of said peripheral flange, said grooved portions being for helping prevent rotation of said bolts when said wing nuts are tightened and loosened.

10. A marking device for visually illuminating a reference point, comprising:

a support bar having first and second ends and a longitudinal axis extending between said first and second ends, said first and second ends being adapted for slidably resting on horizontal portions of an adjacent pair of T-bars of a suspended ceiling;

an illuminating device for emitting a beam of light for illuminating a reference point, said illuminating device being slidably mounted on said support bar;

wherein said illuminating device has a cylindrical housing extending through a slot of said support bar, said housing being slidable along said slot of said support bar between said first and second ends of said support bar, said housing having primary and secondary ends, a longitudinal axis extending between said ends, and a lumen extending through said housing along said longitudinal axis thereof;

wherein said primary end of said housing has a peripheral flange extending therefrom, said peripheral flange resting on said support bar; and wherein said peripheral flange has a pair of opposite apertures extending therethrough, an annular panel being positioned on an opposite side of said support bar with respect to said peripheral flange of said housing, said annular panel having a pair of opposite apertures extending therethrough and being aligned with said apertures of said peripheral flange, at least one fasteners coupling said peripheral flange to said panel.

11. The marking device of claim 10, wherein said support bar has a slot extending therethrough along said longitudinal axis thereof, said illuminating device extending through said slot of said support bar and being slidable along said slot of said support bar between said first and second ends of said support bar.

12. The marking device of claim 11, wherein said slot has rounded ends.

13. The marking device of claim 10, wherein said peripheral flange has a generally ovaloid shaped outer periphery, said annular panel having a generally ovaloid shaped outer periphery.

14. The marking device of claim 10, wherein each of said fasteners has a grooved portion extending radially around, said grooved portions engaging said apertures of said peripheral flange for helping prevent rotation of said fasteners.

* * * * *